United States Patent

Gharpurey

(10) Patent No.: US 7,519,333 B2
(45) Date of Patent: Apr. 14, 2009

(54) RADIO ARCHITECTURE FOR USE WITH FREQUENCY DIVISION DUPLEXED SYSTEMS

(75) Inventor: Ranjit Gharpurey, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 330 days.

(21) Appl. No.: 09/785,759

(22) Filed: Feb. 16, 2001

(65) Prior Publication Data

US 2002/0004372 A1    Jan. 10, 2002

Related U.S. Application Data

(60) Provisional application No. 60/215,711, filed on Jul. 3, 2000.

(51) Int. Cl.
*H04B 1/44* (2006.01)
*H04B 1/40* (2006.01)

(52) U.S. Cl. ................ 455/78; 455/85; 455/86; 455/255

(58) Field of Classification Search .......... 455/85, 455/86, 75, 76, 78, 82, 83, 84, 73, 196.1, 455/230, 255
See application file for complete search history.

(56) References Cited

U.S. PATENT DOCUMENTS

| | | | |
|---|---|---|---|
| 4,605,903 A | | 8/1986 | Ihle |
| 4,766,392 A | * | 8/1988 | Moore .................. 329/323 |
| 5,465,409 A | * | 11/1995 | Borras et al. ............. 455/260 |
| 5,983,077 A | * | 11/1999 | Dent ..................... 455/44 |
| 6,215,988 B1 | * | 4/2001 | Matero .................. 455/188.1 |
| 6,271,737 B1 | * | 8/2001 | Watkinson ............... 331/183 |
| 6,348,830 B1 | | 2/2002 | Rebeiz et al. |
| 6,370,372 B1 | | 4/2002 | Molnar et al. |
| 6,600,911 B1 | * | 7/2003 | Morishige et al. ......... 455/307 |
| 6,603,810 B1 | * | 8/2003 | Bednekoff et al. ......... 375/228 |
| 6,625,436 B1 | * | 9/2003 | Tolson et al. ............ 455/334 |
| 6,810,242 B2 | | 10/2004 | Molnar et al. |

FOREIGN PATENT DOCUMENTS

EP    0 508 401 A2    10/1992
WO   WO 98/20623     5/1998

OTHER PUBLICATIONS

U.S. Appl. No. 09/413,725 (Tolson).*

* cited by examiner

*Primary Examiner*—Eugene Yun
(74) *Attorney, Agent, or Firm*—Ronald O. Neerings; Wade James Brady, III; Frederick J. Telecky, Jr.

(57) ABSTRACT

A radio such as a frequency division duplex (FDD) radio (100) has a first local oscillator ($LO_1I$ and $LO_1Q$) that is set to coincide with the transmitter section's (126) center frequency or a sub-harmonic thereof. In this way, after the first down-conversion, the transmit interferer is converted to DC, where it can be effectively removed using a simple high-pass filter (110, 112) such as a DC blocking capacitor. Image rejection is achieved by the use of a two-step down-conversion approach that uses quadrature local oscillators to implement a single-sideband down-converter.

9 Claims, 1 Drawing Sheet

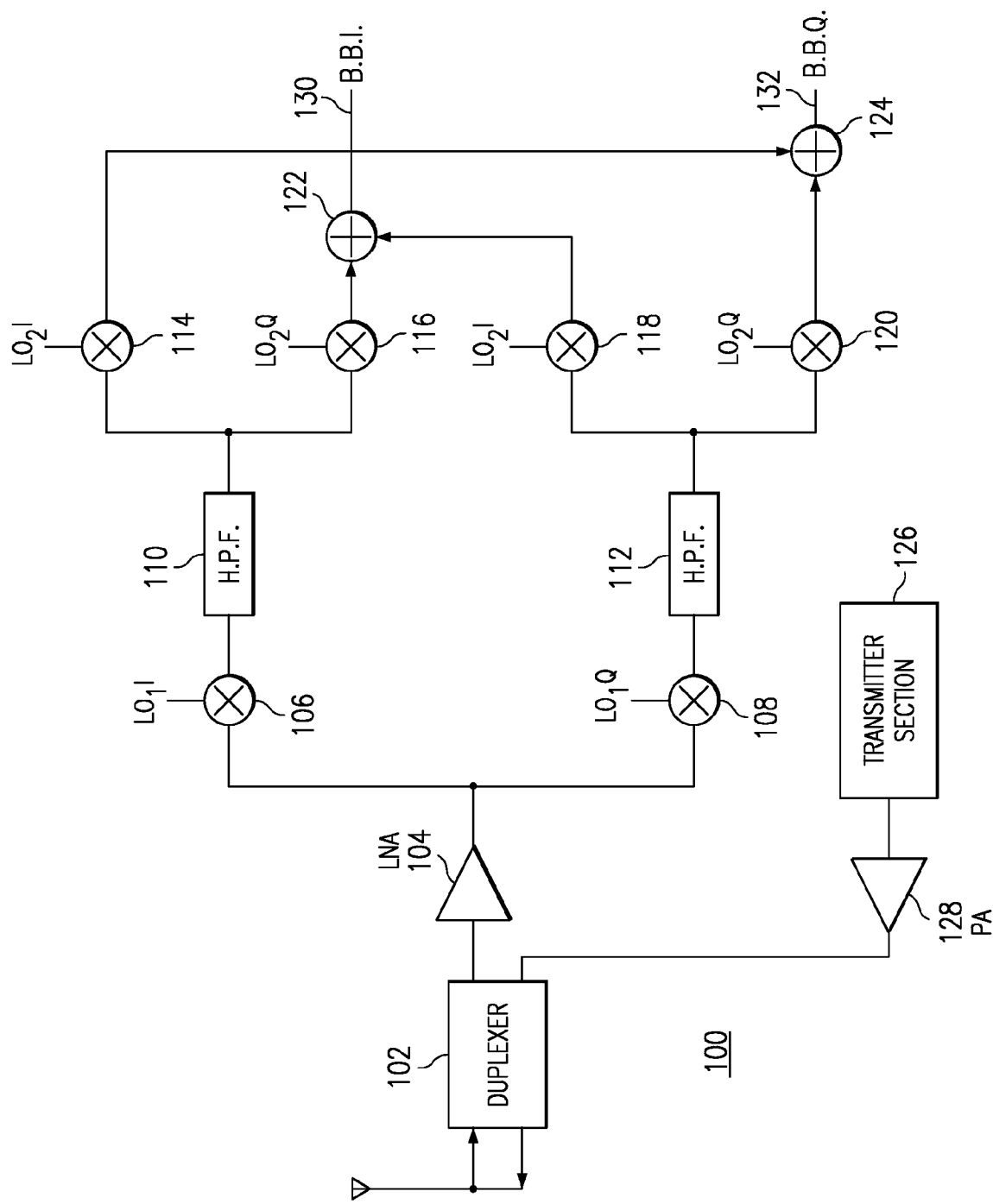

RADIO ARCHITECTURE FOR USE WITH FREQUENCY DIVISION DUPLEXED SYSTEMS

CROSS-REFERENCE TO RELATED APPLICATIONS

This application claims the benefit of U.S. Provisional Application No. 60/215,711, entitled "Receiver Architecture for Frequency Domain Duplexed Systems such as WCDMA", and filed on Jul. 3, 2000.

TECHNICAL FIELD

This invention relates in general to the field of radio communications and more specifically to a radio architecture for use with frequency division duplexed (FDD) systems.

BACKGROUND

Given the huge proliferation of radio communication devices in the last several years with the advent of communication systems like cordless telephones, cellular and personal communication system (PCS) radiotelephones, etc. several possible receiver architectures exist for implementing a radio frequency (RF) receiver. Some of the most prevalent receiver architectures currently in use today are the Superheterodyne receiver, the direct conversion or Homodyne receiver, and the wide-band IF with double conversion receiver. A discussion of these different receiver architectures can be found in an article found in the IEEE journal of Solid-State Circuits, Vol. 32, No. 12, December 1997, entitled "A 1.9-GHz Wide-Band IF Double Conversion CMOS Receiver for Cordless Telephone Applications" by Rudell, et al. Each of the receiver architectures mentioned above has its own unique advantages and disadvantages.

The largest interfering source (also referred to as "interferer") in a frequency division duplex (FDD) radio, such as a wide-band code division multiple access (WCDMA) transceiver, is the output signal from the transmitter's power amplifier. The transmitter output signal can interfere with and sometimes degrade the performance of the transceiver's receiver section. A radio architecture that could help minimize the noted interference problem would be beneficial.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

FIG. 1 shows a block diagram of radio architecture in accordance with the invention.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figure.

The receiver architecture of the present invention reduces the effect of the transmitter acting as an interferer in an FDD radio by reducing the dynamic range requirement on the receiver. Additionally, an integrated image reject scheme is used to further reduce spurious image signals.

In accordance with the invention, the first local oscillator (LO) in the image reject receiver is set to coincide with the transmit (TX) band center frequency, or a sub-harmonic of it. In this way, after the first down-conversion is done, the TX interferer is converted to DC, where it can be effectively removed using a simple high-pass filter such as a DC block integrated capacitor. Image rejection is achieved by the use of a two-step down-conversion approach that preferably uses quadrature LOs to implement a single-sideband down-converter.

The above solution provides for a receiver section that can be integrated helping to reduce the overall cost of the radio solution. Compared to conventional heterodyne receivers, off-chip image reject filters are not required by the design of the preferred embodiment. In addition, compared to direct-conversion architectures, the invention reduces the problem of input second-order intercept point (IIP2) and DC offset requirements caused by the larger interferer from the transmitter.

The preferred embodiment shown in FIG. 1 is implemented using a quasi-homodyne architecture with an important difference. The first local oscillator signal ($LO_1I$ and $LO_1Q$) provided to the first down conversion section including mixers 106 and 108 is set to the transmit frequency band of transmitter section 126. This sets the transmit leakage after the first down-conversion by mixers 106 and 108 to DC which is then filtered off with high pass filters (HPF) 110, 112. The high pass filters 110, 112 can be implemented with very high linearity and low noise, for example, using a simple DC blocking capacitor or cascaded single pole high pass solutions. This effectively removes the largest interferer in the receiver.

In the preferred embodiment, the radio transceiver shown in FIG. 1 is an FDD radio for use with WCDMA systems. It should be noted that FDD is a radio system in which the radio receives and transmits simultaneously. In an exemplary FDD system, the transmitter section power amplifier 128 outputs power at around 25 dbm, which after it makes it through duplexer 102 is about −25 dbm at the low noise amplifier (LNA) 104 input.

These high power signals act as "jammers" to the receiver section and are removed by the High-Pass filters (HPFs) 110 and 112. Image suppression is implemented in the circuit through filtering in the duplexer 102, the tuned LNA 104 and the six image rejection mixers 114, 116, 118, 120, 106, and 108. The second down conversion section of the receiver includes mixers 114, 116, 118, and 120 that help implement a single-sideband down converter.

In a typical example of the present invention, if the transmit frequency of radio 100 is set at 1.96 Gigahertz (GHz) and the receive frequency is at 2.1 GHz then $LO_1I$ and $LO_1Q$ use the transmit frequency of 1.96 GHz (or a sub-harmonic thereof) provided by transmitter section 126 as the LO signal for mixers 106 and 108, which leaves an intermediate frequency (IF) of 200 MHz, which is lowered to baseband by mixers 114, 116, 118 and 120 using $LO_2I$ and $LO_2Q$. Adder 122 then provides the In-phase base band signal (B.B.I.) 130, while adder 124 provides the Quadrature base band signal (B.B.Q.) 132

Some of the advantages of the present invention include, effectively removing the largest interferer in the receiver by moving the transmit frequency to DC and high-pass filtering it. Secondly, image rejection is achieved on-chip without external SAW filters that require off-chip matching and also introduce in-band losses and increase the cost of the design.

Thirdly, since the DC and IIP2 components introduced by the TX interferer are removed after the first mixers 106 and 108, linearity and DC offset constraints are reduced considerably. Finally, since the TX LO is generated in the transmitter, there is no need to generate a separate high frequency LO for the receiver.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

The invention claimed is:

1. A frequency division duplexed (FDD) radio, comprising:
   a duplexer;
   a transmitter section coupled to the duplexer, the transmitter section transmitting in a transmit frequency band having a center frequency;
   a receiver section coupled to the transmitter section, for receiving a signal at a receive frequency that is different from the transmit band center frequency, the receiver section including a down conversion section comprising first and second mixers, said first and second mixers receiving a local oscillator (LO) signal having a frequency equal to the transmit band center frequency or a sub-harmonic thereof;
   a first high pass filter having an input coupled to the output of the first mixer, and having an output;
   a second high pass filter having an input coupled to the output of the second mixer, and having an output;
   a first set of two mixers coupled to the output of the first high pass filter; and
   a second set of two mixers coupled to the output of the second high pass filter.

2. A radio as defined in claim 1, wherein the first and second high pass filters comprise integrated DC blocking capacitors.

3. A radio as defined in claim 1, wherein the first and second high pass filters comprise cascaded single pole high pass filters.

4. A radio as defined in claim 1, wherein a first mixer of the first set of two mixers provides an in-phase (I) component at an output and a second mixer of the first set of two mixers provides a quadrature (Q) component at an output,
   wherein a first mixer of the second set of two mixers provides an in-phase (I) component at an output and a second mixer of the second set of two mixers provides a quadrature (Q) component at an output;
   and further comprising:
      a first adder having a first input for receiving the output of the second mixer of the first set of two mixers, and a second input for receiving the output of the first mixer of the second set of two mixers, said first adder having an output for providing an in-phase component base band signal (B.B.I.); and
      a second adder having a first input for receiving the output of the first mixer of the first set of two mixers, and a second input for receiving the output of the second mixer of the second set of two mixers, said second adder having an output for providing a quadrature component base band signal (B.B.Q.).

5. A radio as defined in claim 1, wherein the first high pass filter passes frequencies including an intermediate frequency corresponding to a difference between the center frequency of the receiver section and the transmit band center frequency; and wherein the second high pass filter passes frequencies including an intermediate frequency corresponding to a difference between the center frequency of the receiver section and the transmit band center frequency.

6. A method of operating a receiver in an FDD radio to remove, from a desired receive signal, interference caused by a transmitter transmitting at a transmit center frequency, the desired receive signal having a receive center frequency that is different from the transmit center frequency, comprising the steps of:
   mixing the receive signal with a local oscillator frequency to provide a down-converted receive signal, the local oscillator frequency equal to the transmit center frequency or a sub-harmonic thereof;
   high-pass filtering the down-converted receive signal; and
   converting the high-pass filtered down-converted receive signal to a base-band signal.

7. A method as defined in claim 6, wherein the high-pass filtering step comprises using one or more DC blocking capacitors to filter the down-converted receive signal.

8. A method as defined in claim 6, wherein the filtering step comprises using one or more cascaded single pole high pass filters to filter the down-converted receive signal.

9. The method of claim 6, wherein the mixing step comprises:
   mixing the receive signal with the local oscillator frequency at a first phase to provide an in-phase down-converted receive signal component; and
   mixing the receive signal with the local oscillator frequency at a quadrature phase, relative to the first phase, to provide a quadrature-phase down-converted receive signal component;
   wherein the down-converted receive signal comprises the in-phase down-converted receive signal component and the quadrature-phase down-converted receive signal component.

* * * * *